(12) United States Patent
Lee (10) Patent No.: US 8,880,003 B2
(45) Date of Patent: Nov. 4, 2014

(54) APPARATUS AND METHOD FOR CONTROLLING TRACKING AREA UPDATE IN WIRELESS COMMUNICATION SYSTEM

(75) Inventor: Song-Hak Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 316 days.

(21) Appl. No.: 13/397,647

(22) Filed: Feb. 15, 2012

(65) Prior Publication Data

US 2012/0208472 A1    Aug. 16, 2012

(30) Foreign Application Priority Data

Feb. 15, 2011 (KR) ........................ 10-2011-0013188

(51) Int. Cl.
*H04B 1/00* (2006.01)
*H04B 7/00* (2006.01)
*H04W 60/02* (2009.01)

(52) U.S. Cl.
CPC .................................... *H04W 60/02* (2013.01)
USPC .............................. 455/68; 455/445; 455/458

(58) Field of Classification Search
USPC .................................... 455/68, 445, 458, 515
See application file for complete search history.

(56) References Cited

U.S. PATENT DOCUMENTS

2010/0099402 A1\* 4/2010 Wu ............................... 455/423
2011/0190010 A1\* 8/2011 Cho .............................. 455/458

\* cited by examiner

*Primary Examiner* — Tuan H Nguyen (57) ABSTRACT

An apparatus and method for controlling Tracking Area Update (TAU) in a wireless communication system are provided. A method for controlling TAU includes, in a case of receiving a request for TAU from a User Equipment (UE), determining a periodic TAU request count of the UE when a type of the TAU is periodic, deciding a TAU period of the UE based on the periodic TAU request count of the UE, and sending the UE a TAU response message including TAU period information of the UE.

20 Claims, 5 Drawing Sheets

APPARATUS AND METHOD FOR CONTROLLING TRACKING AREA UPDATE IN WIRELESS COMMUNICATION SYSTEM

CROSS-REFERENCE TO RELATED APPLICATION(S) AND CLAIM OF PRIORITY

The present application is related to and claims priority under 35 U.S.C. §119(a) to a Korean Patent Application filed in the Korean Intellectual Property Office on Feb. 15, 2011, and assigned Serial No. 10-2011-0013188, the contents of which are herein incorporated by reference.

TECHNICAL FIELD OF THE INVENTION

The present invention relates to an apparatus and method for controlling Tracking Area Update (TAU) of a User Equipment (UE) in a wireless communication system.

BACKGROUND OF THE INVENTION

In a wireless communication system, a UE performs a normal TAU procedure in a case where a Tracking Area (TA) received from an enhanced Node B (eNB) is different from network registration information possessed by the UE. Also, the UE performs a periodic TAU procedure in a case where there is not a change of the TA. For example, in a wireless communication system of the Long Term Evolution (LTE) standard, even in the course of normal TAU procedure implementation, the UE performs periodic TAU considering period information acquired from a network. Here, the period information includes a periodic TAU timer.

As described above, a UE performs periodic TAU although there is not a change of a TA. That is, the UE consumes power due to periodic TAU implementation. Also, there is a problem that a network unnecessarily consumes a wireless resource owing to transmission/reception of a message for the periodic TAU procedure of the UE.

Further, the network controls all UEs to perform periodic TAU at the same period. Accordingly, there is a problem in which, in a case where a plurality of UEs are located in the same area, periodic TAU of the UEs causes a sudden increase of a load of a network in which the UEs are located.

SUMMARY OF THE INVENTION

To address the above-discussed deficiencies of the prior art, it is an object of the present disclosure to provide at least the advantages below. Accordingly, one aspect of the present disclosure is to provide an apparatus and method for controlling Tracking Area Update (TAU) of a User Equipment (UE) in a wireless communication system.

Another aspect of the present disclosure is to provide an apparatus and method for reducing the power consumption of a UE resulting from periodic TAU in a wireless communication system.

A further aspect of the present disclosure is to provide an apparatus and method for reducing a load of a network resulting from periodic TAU in a wireless communication system.

Yet another aspect of the present disclosure is to provide an apparatus and method for applying a TAU period of a UE variably according to a characteristic of the UE in a wireless communication system.

Still another aspect of the present disclosure is to provide an apparatus and method for controlling a TAU period of a UE in a wireless communication system.

Still another aspect of the present disclosure is to provide an apparatus and method for controlling a TAU period of a UE using an Evolved Packet System (EPS) Mobility Management (EMM) context in a wireless communication system.

The above aspects are achieved by providing an apparatus and method for controlling TAU in a wireless communication system.

According to one aspect of the present disclosure, a method for controlling TAU of a UE in a wireless communication system is provided. The method includes, in a case of receiving a request for TAU from a UE, determining a periodic TAU request count of the UE when a type of the TAU is periodic, deciding a TAU period of the UE based on the periodic TAU request count of the UE, and sending the UE a TAU response message including TAU period information of the UE.

According to another aspect of the present disclosure, an apparatus for controlling TAU of a UE in a wireless communication system is provided. The apparatus includes a controller, a message generator, and an interface. In a case of receiving a request for TAU from a UE, the controller is configured to decide a TAU period of the UE based on a periodic TAU request count of the UE when a type of the TAU is periodic. The message generator is configured to generate a TAU response message including the TAU period of the UE decided in the controller. The interface is configure to send the TAU response message generated in the message generator.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. Embodiments of the present disclosure will be described herein below with reference to the accompanying drawings.

The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings but are merely used by the inventor to enable a clear and consistent understanding of the disclosure. Accordingly, it should be apparent to those skilled in the art that the following description of exemplary embodiments of the present disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly but that deviations or variations, including for example, tolerances, measurement error, measurement accuracy limitations and other factors known to those of skill in the art, may occur in amounts that do not preclude the effect the characteristic was intended to provide.

A technology for controlling a Tracking Area Update (TAU) period of a User Equipment (UE) in a wireless communication system according to an exemplary embodiment of the present disclosure is described below.

In the following description, it is assumed that a wireless communication system employs the Long Term Evolution (LTE) standard. However, the wireless communication system can identically control a TAU period even in a case where the wireless communication system employs other communication standards.

Figure 1:
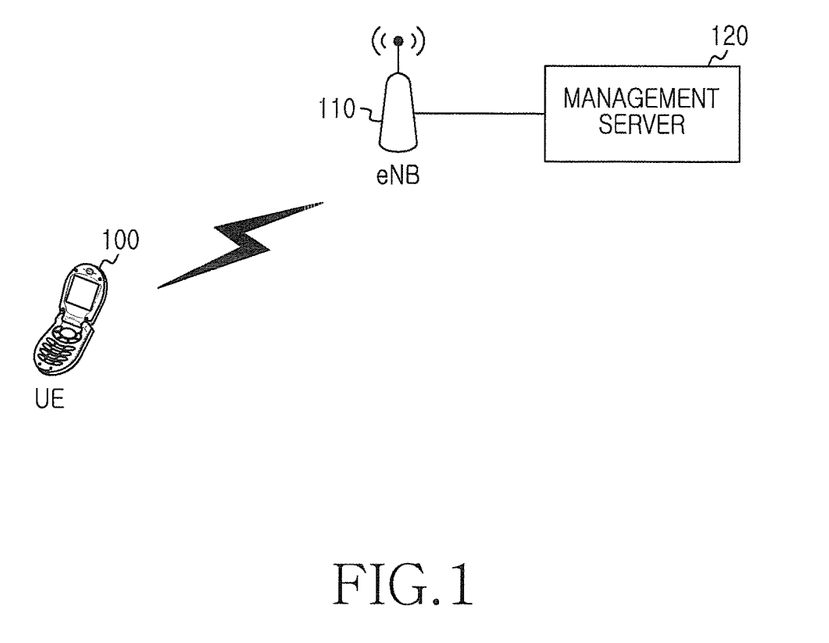
FIG. 1 is a diagram illustrating a construction of a wireless communication system according to an exemplary embodiment of the present disclosure.

FIG. 1 illustrates a construction of a wireless communication system according to an exemplary embodiment of the present disclosure.

As illustrated in FIG. 1, the wireless communication system includes a User Equipment (UE) 100, an enhanced Node B (eNB) 110, and a management server 120. Here, the management server 120 includes a Mobility Management Entity (MME) defined in the LTE standard.

The UE 100 compares a Tracking Area (TA) acquired from the eNB 110 with network registration information in the UE 100 and identifies if there is a change of a TA of the UE 100 registered to the management server 120. At this time, the UE 100 receives a TA broadcasted by the eNB 110.

If the TA acquired from the eNB 110 and the network registration information are different from each other, the UE 100 performs a normal TAU procedure to the management server 120 through the eNB 110.

Also, the UE 100 performs a periodic TAU procedure according to period information received from the management server 120. At this time, even in the course of normal TAU procedure implementation, the UE 100 may perform the periodic TAU procedure according to the period information.

The management server 120 manages TAs of UEs serviced by the eNB 110. For example, in a case where the management server 120 receives a TAU request message for normal TAU from the UE 100 through the eNB 110, the management server 120 transmits TAU period information defined in system information to the UE 100 through the eNB 110. For another example, in a case where the management server 120 receives a TAU request message for periodic TAU from the UE 100 through the eNB 110, the management server 120 determines a TAU count that the UE 100 has performed by periods. If the TAU count that the UE 100 has performed by periods is equal to or greater than a reference count, the management server 120 controls a TAU period of the UE 100. After that, the management server 120 transmits the controlled TAU period information to the UE 100 through the eNB 110.

The management server 120 manages a Mobile Reachable Timer (MRT) for mobility management of the UE 100. The MRT is driven or the driving is terminated every TAU of the UE 100. For example, the management server 120 sends the UE 100 a response message to the TAU request message of the UE 100 through the eNB 110 and then drives the MRT.

After that, in a case where the management server 120 fails to receive a different TAU request message from the UE 100 up to the expiration of a driving time of the MRT, the management server 120 recognizes that the UE 100 is in a paging impossible state. According to this, the management server 120 sets the driving time of the MRT longer than the TAU period of the UE 100.

The following description is made for an operation method of the management server 120 for deciding the TAU period of the UE 100.

Figure 2:
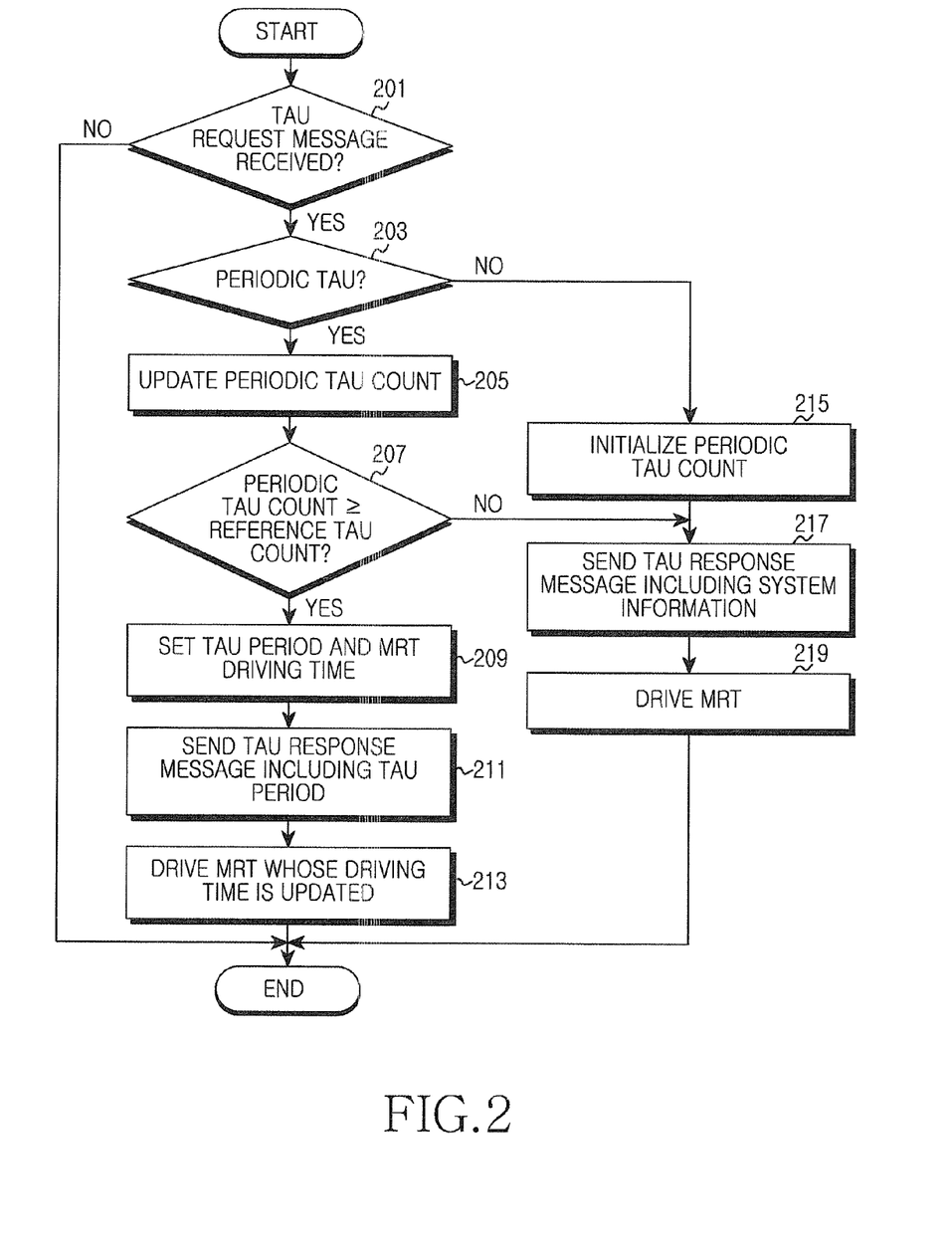
FIG. 2 is a flowchart illustrating a procedure for deciding a Tracking Area Update (TAU) period of a User Equipment (UE) in a management server according to an exemplary embodiment of the present disclosure.

FIG. 2 illustrates a procedure for deciding a TAU period of a UE in a management server according to an exemplary embodiment of the present disclosure.

Referring to FIG. 2, in step 201, the management server 120 identifies if a TAU request message of the UE 100 is received. For example, as illustrated in FIG. 1, the management server 120 identifies if a TAU request message of the UE 100 is received through the eNB 110.

If it is identified in step 201 that the TAU request message is not received, the management server 120 terminates the algorithm according to the exemplary embodiment of the present disclosure. At this time, the management server 120 continuously identifies if a TAU request message of the UE 100 is received.

In contrast, if it is identified in step 201 that the TAU request message is received, the management server 120 proceeds to step 203 and identifies if the TAU request message is for normal TAU of the UE 100 or is for periodic TAU of the UE 100. If the TAU request message is received during driving of an MRT, the management server 120 stops the driving of the MRT.

If it is identified in step 203 that a TAU request message is for normal TAU of the UE 100, the management server 120 proceeds to step 215 and initializes the number of times of periodic TAU performance of the UE 100. For example, in a case where the management server 120 accepts a normal TAU request of the UE 100, the management server 120 creates an Evolved Packet System (EPS) Mobility Management (EMM) context of the UE 100 constructed as in Table 1 below. At this time, the management server 120 initializes a periodic TAU receive counter field value of the EMM context.

TABLE 1

| EMM Context information | Description |
|---|---|
| IMSI | International Mobile Subscriber Identity (Key Value) |
| . | |
| . | |
| . | |
| Tracking Area | TA information in which UE is currently located |
| . | |
| . | |
| . | |
| Paging Possible Flag (PPF) | Indicator indicating paging possibility or impossibility |
| Periodic TA Update Timer | Periodic TA update timer |
| Mobile Reachable Timer (MRT) | Periodic TA check timer |
| Periodic TA Update Receive Counter | Periodic TA Update Receive Counter 'initial value = 0' |
| . | |
| . | |
| . | |

Here, the EMM context of the UE 100 includes a TA field representing a TA of the UE 100, a paging possible flag field representing the paging possibility or impossibility of the UE 100, a periodic TAU timer field representing a period for periodic TAU of the UE 100, an MRT field for managing the mobility of the UE 100, and a periodic TAU receive counter field representing a reception count for a TAU request message that the UE 100 has transmitted for periodic TAU.

After that, the management server 120 proceeds to step 217 and sends the UE 100 a TAU response message including TAU period information defined in system information. For example, the system information of the management server 120 includes information of Table 2 below.

TABLE 2

| System Context information | Description |
|---|---|
| Periodic TA Update Timer | Timer applied to UE at initial registration or normal update |
| Mobile Reachable Timer (MRT) | Timer applied to network at initial registration or normal update |
| . | |
| . | |
| . | |
| Maximum Periodic TA Update Check Counter | Periodic TA update check counter Initial value can be set by system manager 'example: initial value = 5' |
| . | |
| . | |
| . | |

Here, the system information includes a periodic TAU timer field including period information in which the UE 100 having performed normal TAU will perform periodic TAU afterwards, an MRT field for managing the mobility of the UE 100, and a maximum periodic TAU check counter field including a reference value for deciding whether to change a TAU period of the UE 100.

After sending the TAU response message to the UE 100, the management server 120 proceeds to step 219 and drives the MRT. At this time, the MRT operates according to MRT information defined in the system information.

In contrast, if it is identified in step 203 that the TAU request message is for the periodic TAU of the UE 100, the management server 120 proceeds to step 205 and updates the number of times of periodic TAU performance of the UE 100. For example, the management server 120 increases, by '1', the periodic TAU receive counter field value of the EMM context of the UE 100 constructed as in Table 1 above.

Next, the management server 120 proceeds to step 207 and decides whether to control the TAU period of the UE 100 considering the number of times of periodic TAU performance of the UE 100. For example, the management server 120 compares the periodic TAU receive counter field value updated in step 205 with a reference TAU count to decide whether or not to control the TAU period of the UE 100.

If the comparison result of step 207 is that the periodic TAU receive counter field value is less than the reference TAU count, the management server 120 recognizes that it does not control the TAU period of the UE 100. According to this, the management server 120 proceeds to step 217 and sends the UE 100 a TAU response message including TAU period information defined in system information.

In contrast, if the comparison result of step 207 is that the periodic TAU receive counter field value is greater than or equal to the reference TAU count, the management server 120 recognizes that it controls the TAU period of the UE 100. According to this, the management server 120 proceeds to step 209 and decides a period in which the UE 100 will perform periodic TAU and a driving time of the MRT. For example, the management server 120 decides a period in which the UE 100 will perform periodic TAU according to the kind of service provided to the UE 100. For another example, the management server 120 can extend a period in which the UE 100 will perform periodic TAU into a preset period. For further example, the management server 120 may extend a period in which the UE 100 will perform periodic TAU in proportion to the number of times of TAU that the UE 100 has periodically performed. At this time, the management server 120 sets the driving time of the MRT longer than the decided period in which the UE 100 will perform the periodic TAU.

After that, the management server 120 proceeds to step 211 and sends the UE 100 a TAU response message including the decided TAU period information. For example, the management server 120 sends the UE 100 a TAU response message including the EMM context information of the UE 100. Here, the EMM context of the UE 100 includes information of the period in which the UE 100 will perform the periodic TAU and the driving time of the MRT decided in step 209.

After sending the TAU response message, the management server 120 proceeds to step 213 and drives the MRT operating according to the MRT driving time decided in step 209. That is, the management server 120 drives the MRT operating at the MRT driving time defined in the EMM context of the UE 100.

Next, the management server 120 terminates the algorithm according to the present disclosure.

Figure 3:
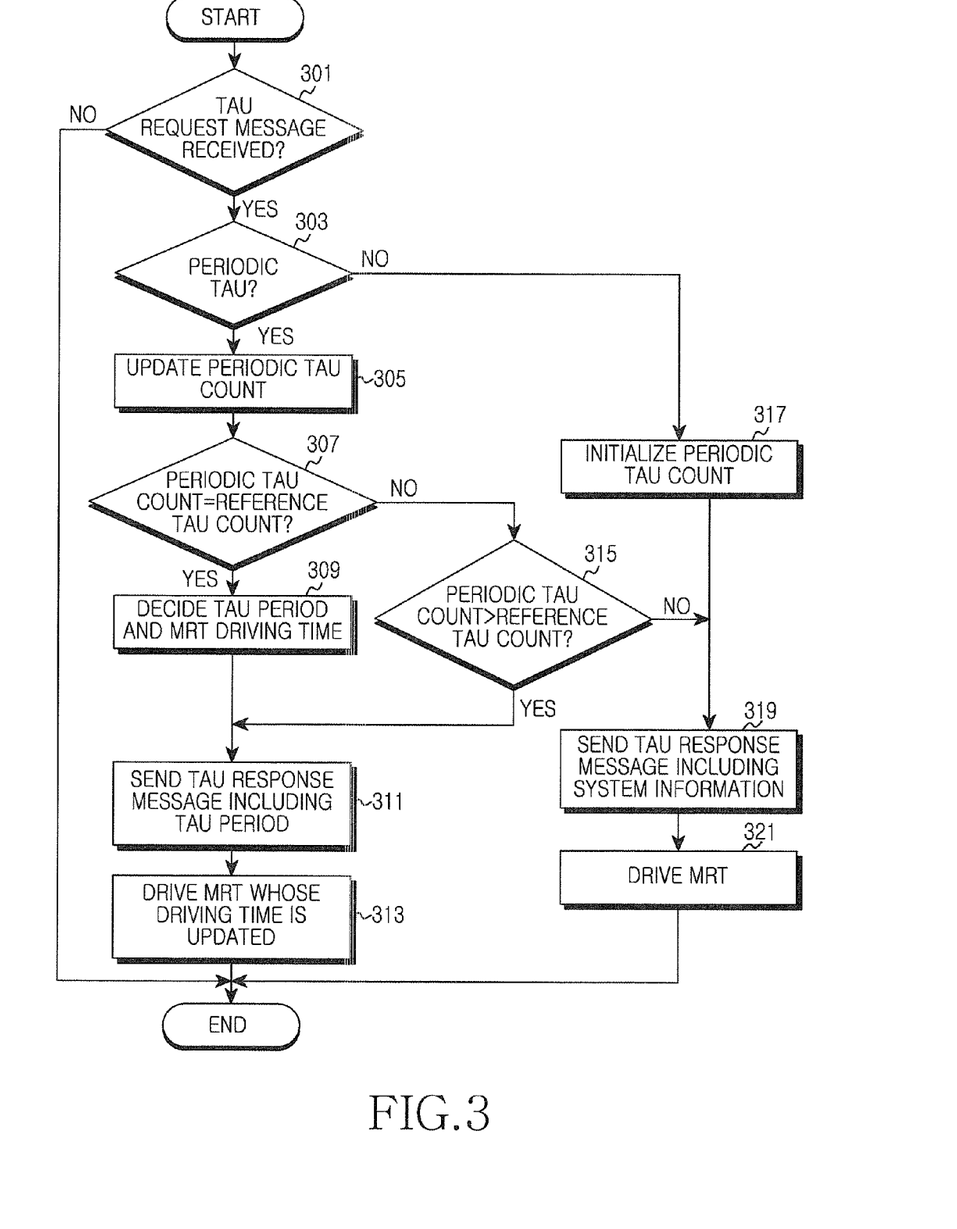
FIG. 3 is a flowchart illustrating a procedure for deciding a TAU period of a UE in a management server according to another exemplary embodiment of the present disclosure.

FIG. 3 illustrates a procedure for deciding a TAU period of a UE in a management server according to another exemplary embodiment of the present disclosure.

Referring to FIG. 3, in step 301, the management server 120 identifies if a TAU request message of the UE 100 is received. For example, as illustrated in FIG. 1, the management server 120 identifies if a TAU request message of the UE 100 is received through an eNB 110.

If it is identified in step 301 that the TAU request message is not received, the management server 120 terminates the algorithm according to the exemplary embodiment of the present disclosure. At this time, the management server 120 continuously identifies if a TAU request message of the UE 100 is received.

In contrast, if it is identified in step 301 that the TAU request message is received, the management server 120 proceeds to step 303 and identifies if the TAU request message is for normal TAU of the UE 100 or is for periodic TAU of the UE 100. If the TAU request message is received during driving of an MRT, the management server 120 stops the driving of the MRT.

If it is identified in step 303 that the TAU request message is for the normal TAU of the UE 100, the management server 120 proceeds to step 317 and initializes the number of times of periodic TAU performance of the UE 100. For example, the management server 120 initializes a periodic TAU receive counter field value of an EMM context of the UE 100 constructed as in Table 1 above.

After that, the management server 120 proceeds to step 319 and sends the UE 100 a TAU response message including TAU period information defined in system information.

After sending the TAU response message to the UE 100, the management server 120 proceeds to step 321 and drives the MRT. At this time, the MRT operates according to MRT information defined in the system information.

In contrast, if it is identified in step 303 that the TAU request message is for the periodic TAU of the UE 100, the management server 120 proceeds to step 305 and updates the number of times of periodic TAU performance of the UE 100 having sent the TAU request message. For example, the management server 120 increases, by '1', the periodic TAU receive counter field value of the EMM context of the UE 100 constructed as in Table 1 above.

Next, the management server 120 proceeds to step 307 and decides whether to control the TAU period of the UE 100 considering the number of times of periodic TAU performance of the UE 100. For example, the management server 120 compares the periodic TAU receive counter field value updated in step 305 with a reference TAU count to decide whether or not to control the TAU period of the UE 100.

In a case where the periodic TAU receive counter field value and the reference TAU count are not equal to each other, the management server 120 proceeds to step 315 and identifies if the periodic TAU receive counter field value is greater than the reference TAU count.

If the comparison result of step 315 is that the periodic TAU receive counter field value is less than the reference TAU count, the management server 120 recognizes that it does not control the TAU period of the UE 100. According to this, the management server 120 proceeds to step 319 and sends the UE 100 a TAU response message including TAU period information defined in system information.

If the comparison result of step 315 is that the periodic TAU receive counter field value is greater than the reference TAU count, the management server 120 recognizes that it has already decided a TAU period of the UE 100. According to this, the management server 120 proceeds to step 311 and sends the UE 100 a TAU response message including previously decided TAU period information.

In contrast, if the comparison result of step 307 is that the periodic TAU receive counter field value and the reference TAU count are equal to each other, the management server 120 recognizes that it controls the TAU period of the UE 100. According to this, the management server 120 proceeds to step 309 and decides a period in which the UE 100 will perform periodic TAU and a driving time of the MRT. For example, the management server 120 decides a period in which the UE 100 will perform periodic TAU according to the kind of service provided to the UE 100. For another example, the management server 120 can extend a period in which the UE 100 will perform periodic TAU into a preset period. For further example, the management server 120 may extend a period in which the UE 100 will perform periodic TAU in proportion to the number of times of TAU that the UE 100 has periodically performed. At this time, the management server 120 sets the driving time of the MRT longer than the decided period in which the UE 100 will perform the periodic TAU.

After that, the management server 120 proceeds to step 311 and sends the UE 100 a TAU response message including the decided TAU period information. For example, the management server 120 sends the UE 100 a TAU response message including the EMM context information of the UE 100. Here, the EMM context of the UE 100 includes information of the period in which the UE 100 will perform the periodic TAU and the driving time of the MRT decided in step 309.

After sending the TAU response message, the management server 120 proceeds to step 313 and drives the MRT operating according to the MRT driving time decided in step 309. That is, the management server 120 drives the MRT operating at the MRT driving time defined in the EMM context of the UE 100.

Next, the management server 120 terminates the algorithm according to the present disclosure.

In the aforementioned exemplary embodiment, in a case where the management server 120 accepts a normal TAU request of a UE 100, the management server 120 creates an EMM context of the UE 100 and initializes a periodic TAU receive counter field value included in the EMM context.

In another exemplary embodiment, after sending a response message to a normal TAU request of the UE 100, the management server 120 may create an EMM context of the UE 100 and initialize a periodic TAU receive counter field value included in the EMM context.

The following description is made for an operation method of a UE 100 for performing TAU according to the control of the management server 120.

Figure 4:
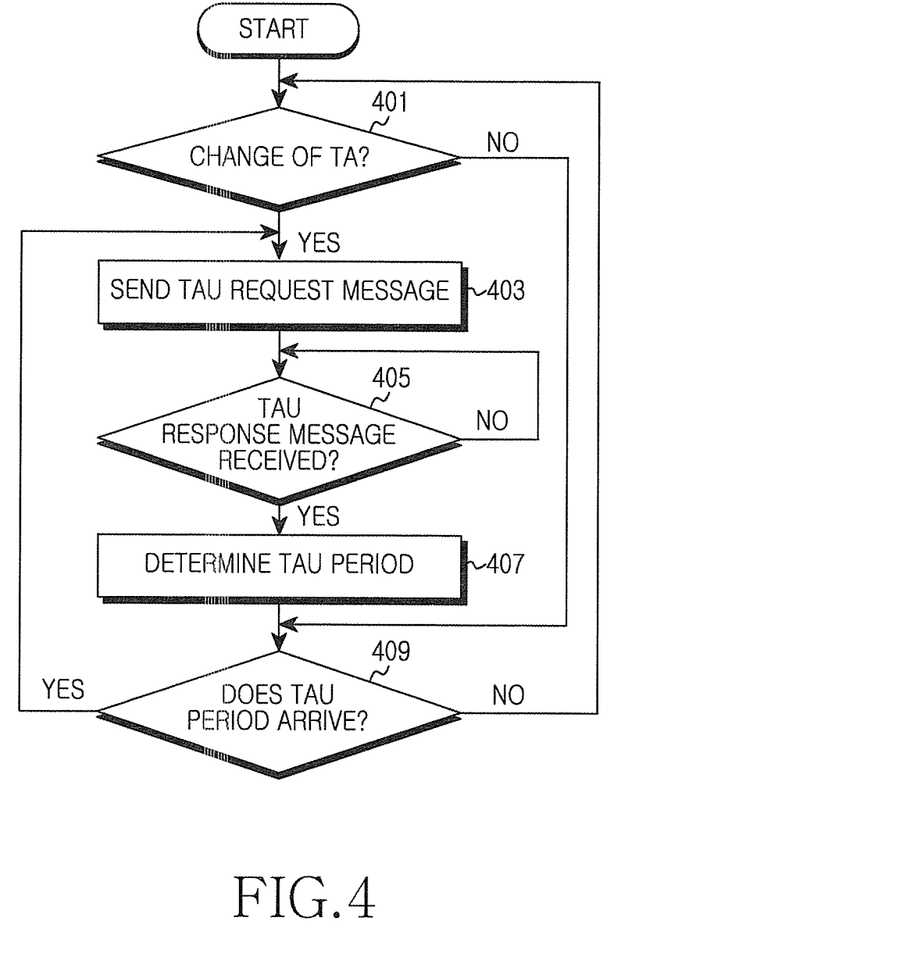
FIG. 4 is a flowchart illustrating a procedure for performing TAU in a UE according to an exemplary embodiment of the present disclosure.

FIG. 4 illustrates a procedure for performing TAU in a UE according to an exemplary embodiment of the present disclosure.

Referring to FIG. 4, in step 401, the UE 100 identifies if there is a change of a TA. For example, as illustrated in FIG. 1, the UE 100 compares a TA provided from an eNB 110 with network registration information possessed by the UE 100 itself. If the TA provided from the eNB 110 and the network registration information are different from each other, the UE 100 recognizes that there is a change of the TA. For another example, in a case where the UE 100 has initial access to the eNB 110, the UE 100 may recognize that there is a change of the TA.

In a case where it is identified in step 401 that there is not a change of the TA, the UE 100 jumps to step 409 and identifies if a TAU period arrives.

In contrast, in a case where it is identified in step 401 that there is a change of the TA, the UE 100 proceeds to step 403 and sends a TAU request message. For example, in FIG. 1, the UE 100 sends a TAU request message for normal TAU to a management server 120 through the eNB 110.

After that, the UE 100 proceeds to step 405 and identifies if a response message to the TAU request message is received from the eNB 110.

In a case where it is identified in step 405 that the response message is received, the UE 100 proceeds to step 407 and determines a period for periodic TAU in the response message. For example, in a case where the UE 100 sends a TAU request message for normal TAU in step 403, the UE 100 determines a period for performing periodic TAU in system information included in the response message. For another example, in a case where the UE 100 sends a TAU request message for periodic TAU in step 403, as described below in connection with the determination in step 409, the UE 100 determines a period for performing periodic TAU in EMM context information included in the response message. At this time, the UE 100 operates a timer driven at the determined period.

Next, the UE 100 proceeds to step 409 and identifies if a TAU period arrives. For example, the UE 100 identifies if a driving time of the timer operating in step 407 expires.

If it is identified in step 409 that the TAU period does not arrive, the UE 100 returns to step 401 and identifies if there is a change of a TA.

In contrast, if it is identified in step 409 that the TAU period arrives, the UE 100 returns to step 403 and sends a TAU request message. For example, in FIG. 1, the UE 100 sends a TAU request message for periodic TAU to the management server 120 through the eNB 110.

Figure 5:
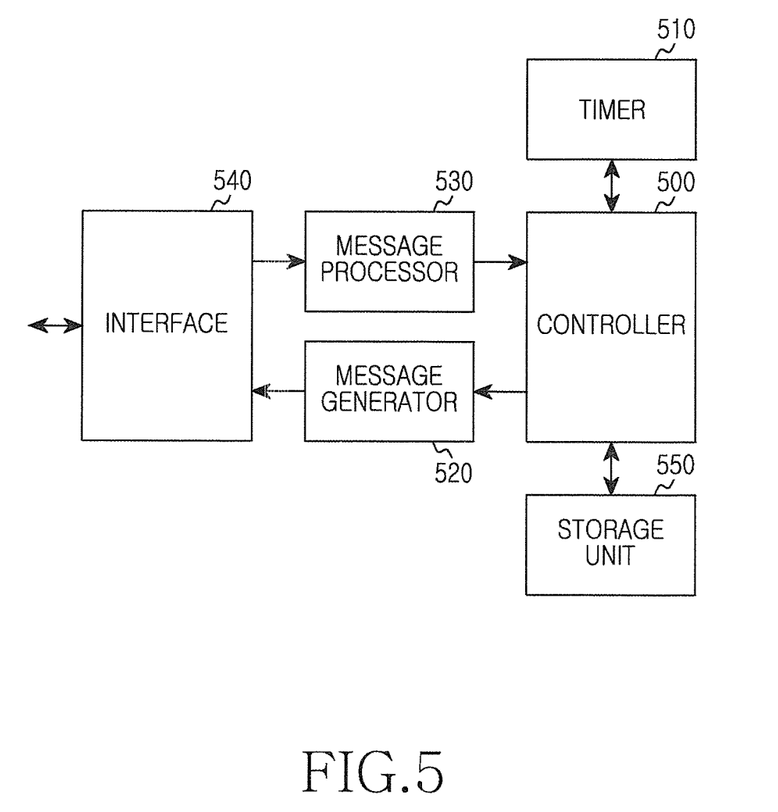
FIG. 5 is a block diagram illustrating a construction of a management server according to the present disclosure.

The following description is made for a construction of a management server 120 for controlling a TAU period of a UE 100.

FIG. 5 illustrates a construction of a management server according to the present disclosure.

As illustrated in FIG. 5, the management server 120 includes a controller 500, a timer 510, a message generator 520, a message processor 530, an interface 540, and a storage unit 550.

The controller 500 manages a TA of at least one UE. For example, in a case where the controller 500 receives a request for TAU from a UE, the controller 500 decides whether to accept the TAU of the UE. If it is decided to accept the TAU of the UE, the controller 500 creates an EMM context for managing the TA of the UE. For another example, in a case where the controller 500 receives a TAU request message for periodic TAU from the UE, the controller 500 decides a driving time of the timer 510 considering a periodic TAU count of the UE. If the periodic TAU count of the UE is less than a reference TAU count, the controller 500 controls driving of the timer 510 to operate at a driving time defined in a system. In contrast, if the periodic TAU count of the UE is greater than or equal to the reference TAU count, the controller 500 decides a period in which the UE will perform periodic TAU. At this time, the controller 500 decides the driving time of the timer 510 considering the decided period and controls driving of the timer 510 to operate at the driving time. For another example, in a case where the controller 500 receives a request for normal TAU from the UE, the controller 500 controls the driving of the timer 510 to operate at the driving time defined in the system.

If the controller 500 fails to receive a TAU request message from a UE until the expiration of the driving time of the timer 510, the controller 500 recognizes that the UE is in a paging impossible state.

The timer 510 is driven according to the control of the controller 500 to manage the mobility of a UE. For example, in a case where the controller 500 accepts a TAU request of the UE, the timer 510 is driven according to the control of the controller 500. Also, in a case where a TAU request message is received from the UE during driving, the timer 510 stops the driving according to the control of the controller 500.

The message generator 520 generates a control message to be sent to a UE according to the control of the controller 500. For example, in a case where a periodic TAU count of the UE is less than a reference TAU count, the message generator 520 generates a TAU response message including system information constructed as in Table 1 above according to the control of the controller 500. For another example, in a case where the periodic TAU count of the UE is greater than or equal to the reference TAU count, the message generator 520 generates a TAU response message including EMM context information on the UE constructed as in Table 2 above according to the control of the controller 500. For further example, in a case where a UE makes a request for normal TAU, the message generator 520 generates a TAU response message including system information constructed as in Table 1 above according to the control of the controller 500.

The interface 540 transmits a signal to and receives a signal from the eNB 110 through a wired network.

The message processor 530 processes a TAU request message provided through the interface 540. For example, the message processor 530 determines a type of the TAU request message and transmits the type to the controller 500. Here, the type of the message represents if the TAU request message is used for normal TAU or is used for periodic TAU.

The storage unit 550 stores a program for controlling an operation of the management server 120 and data generated during the execution of the program. For example, the storage unit 550 stores system information and EMM context information of a UE generated in the controller 500.

As described above, exemplary embodiments of the present disclosure have an advantage of, by variably controlling a TAU period of a UE, being capable of reducing the consumption of power and wireless resource of a UE resulting from periodic TAU and being, capable of reducing a network load resulting from periodic TAU of UEs in a wireless communication system.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An operating method of a management server for controlling Tracking Area Update (TAU) of a User Equipment (UE) in a wireless communication system, the method comprising:
   in a case of receiving a request for the TAU from the UE, determining a periodic TAU request count of the UE when a type of the TAU is a periodic TAU type;
   deciding a TAU period of the UE based on the periodic TAU request count of the UE; and
   sending the UE a TAU response message comprising TAU period information of the UE.

2. The method of claim 1, further comprising, in a case of receiving the request for the TAU from the UE, determining the type of the TAU of the UE, wherein the type of the TAU comprises one of the periodic TAU type or a normal TAU type.

3. The method of claim 2, further comprising sending the UE a TAU response message comprising system information when the type of the TAU is the normal TAU type.

4. The method of claim 1, wherein deciding the TAU period of the UE comprises extending the TAU period of the UE when the periodic TAU request count of the UE is equal to or greater than a reference TAU count.

5. The method of claim 4, wherein deciding the TAU period of the UE further comprises setting the TAU period of the UE to a period comprised in system information when the periodic TAU request count of the UE is less than the reference TAU count.

6. The method of claim 1, wherein deciding the TAU period of the UE comprises deciding the TAU period of the UE based on a kind of service provided to the UE when the periodic TAU request count of the UE is equal to or greater than a reference TAU count.

7. The method of claim 1, wherein sending the UE the TAU response message comprises:
   generating Evolved Packet System (EPS) Mobility Management (EMM) context information of the UE; and
   sending the UE a TAU response message comprising the EMM context information.

8. The method of claim 7, wherein the EMM context information comprises at least one of a tracking area of the UE, paging possibility or impossibility of the UE, the TAU period of the UE, Mobile Reachable Timer (MRT) information, and the periodic TAU request count.

9. The method of claim 1, further comprising, after deciding the TAU period of the UE, deciding a driving time of an MRT based on the TAU period of the UE.

10. The method of claim 9, further comprising, after sending the UE the TAU response message, operating the MRT during the decided driving time of the MRT.

11. An operating apparatus of a management server for controlling Tracking Area Update (TAU) of a User Equipment (UE) in a wireless communication system, the apparatus comprising:
   a controller configured to decide, in a case of receiving a request for the TAU from the UE, a TAU period of the UE based on a periodic TAU request count of the UE when a type of the TAU is a periodic TAU type;
   a message generator configured to generate a TAU response message comprising the TAU period of the UE decided in the controller; and
   an interface configured to send the TAU response message generated in the message generator.

12. The apparatus of claim 11, wherein, in a case where the UE sends a request for TAU, the controller is further configured to determine the type of the TAU of the UE, wherein the type comprises one of the periodic TAU type a normal TAU type.

13. The apparatus of claim 12, wherein the message generator is further configured to generate a TAU response message comprising system information when the type of the TAU is the normal TAU type.

14. The apparatus of claim 11, wherein, when the periodic TAU request count of the UE is equal to or greater than a reference TAU count, the controller is further configured to extend the TAU period of the UE.

15. The apparatus of claim 14, wherein, when the periodic TAU request count of the UE is less than the reference TAU count, the controller is further configured to set the TAU period of the UE to a period comprised in system information.

16. The apparatus of claim 11, wherein, when the periodic TAU request count of the UE is equal to or greater than a reference TAU count, the controller is further configured to decide the TAU period of the UE based on a kind of service provided to the UE.

17. The apparatus of claim 11, wherein the message generator is further configured to generate Evolved Packet System (EPS) Mobility Management (EMM) context information of the UE.

18. The apparatus of claim 17, wherein the EMM context information comprises at least one of a tracking area of the UE, paging possibility or impossibility of the UE, the TAU period of the UE, Mobile Reachable Timer (MRT) information, and the periodic TAU request count.

19. The apparatus of claim 11, wherein, after deciding the TAU period of the UE, the controller is further configured to decide a driving time of an MRT based on the TAU period of the UE.

20. The apparatus of claim 19, wherein the controller is further configured to operate the MRT during the driving time of the MRT.

* * * * *